(No Model.)
G. P. DODGE.
BELTING.
No. 450,999. Patented Apr. 21, 1891.
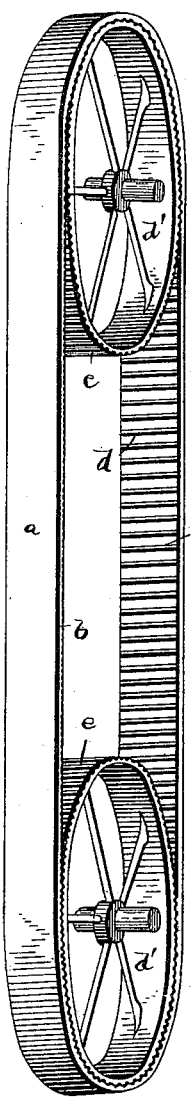
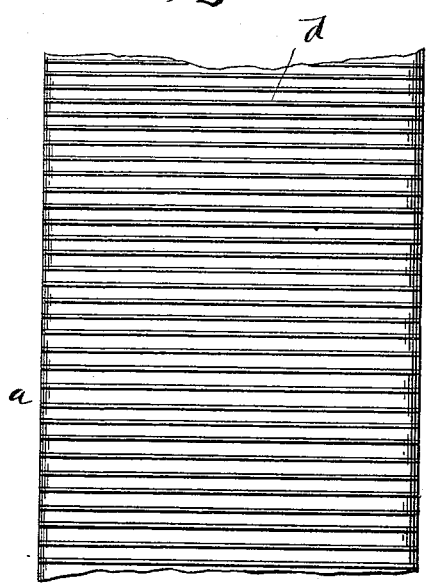
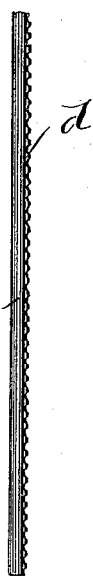
Witnesses:
E. C. Duffy
H. E. Peck
Inventor:
Geo. P. Dodge
per O. E. Duff
Attorney

UNITED STATES PATENT OFFICE.

GEORGE P. DODGE, OF GREAT NECK, NEW YORK, ASSIGNOR TO THE MINERALIZED RUBBER COMPANY, OF NEW YORK.

BELTING.

SPECIFICATION forming part of Letters Patent No. 450,999, dated April 21, 1891.

Application filed April 21, 1890. Serial No. 348,764. (No model.)

*To all whom it may concern:*

Be it known that I, GEORGE P. DODGE, of Great Neck, in the county of Queens and State of New York, have invented certain new and useful Improvements in Belting; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in flexible belting, and more particularly to composite belting for transmitting power, consisting of woven, fibrous, or other suitable flexible material and rubber or other like substance.

The object of the invention is to provide an improved cheap, durable, easily-made, flexible composite belting particularly adapted for use with pulleys having their peripheries covered with a rubber facing transversely fluted upon the outer side, whereby all slipping is prevented and the belting takes hold of the pulley with a far tighter grip than ordinarily. These objects are accomplished by and this invention consists in certain novel features of construction more fully described hereinafter, and particularly pointed out in the claims.

Referring to the accompanying drawings, Figure 1 is a perspective of a pair of pulleys and the improved belt connecting the same. Fig. 2 is a plan of the contact or gripping face of a portion of the belt. Fig. 3 is a longitudinal section of a length of the belting. Fig. 4 is an edge view of the belting.

In the drawings, the reference-letter *a* indicates a belting composed of duck or other strong durable flexible fibrous material suitable to form the foundation for driving-belts and rubber or compounds thereof. There are preferably one or more layers of duck or flexible material united by the rubber, with the entire exterior coated with rubber, as shown, and vulcanized, mineralized, or otherwise cured under pressure. The outer surface *b* of the belting is usually and preferably plain and smooth, while the inner gripping-surface *d* of the belt is transversely fluted, as clearly shown. These flutes are narrow and located closely together and formed by closely-located transverse shallow parallel grooves of the same depth throughout and extending completely across the gripping-face of the belt from one longitudinal face to the other, thereby forming narrow low ridges between the grooves of the same height throughout. These flutes in the exterior rubber or composition coating of the belt can be formed by pressure or in any other suitable manner.

*d' d'* indicate two pulleys provided with a rubber or composition facing *e*, the outer gripping-surface of which is transversely fluted similarly to and to correspond with the gripping-face of the belt. This fluted belting is particularly and most advantageously adapted for use with such a pulley as here shown, as all slipping is prevented and the belt secures a firm hold and grip on the wheel as the parallel transverse flutes of the belt and pulley covering intermesh like the teeth of cog-wheels and work without noise. This gripping and holding capacity is increased by the elastic qualities of the belt-covering or exterior in which the flutes are formed; and, further, this peculiar fluted belting is a great improvement, especially for all places where belts are run over small pulleys at high speed, outdoors, in damp or wet places, or where there is much steam, or where there is considerable dust flying, and everywhere that it is desirable to prevent all slipping in the direction of motion, because from the elastic nature of the rubber, which is fully developed by the fluting to give room for its compression and expansion, a far tighter grip is obtained on the pulleys, the flutings acting like claws and taking a firm hold, which renders slipping almost impossible.

The present peculiar composite belting is not limited to use on pulleys such as shown in Fig. 1.

This belt may be made smooth on the outer side and provided with flutings on its inner surface, so as to render the belt reversible, and the smooth or fluted side can be used as desired, either on smooth or fluted pulleys.

Of course any suitable elastic material or composition other than rubber can be employed, if desirable, or other flexible material than canvas duck.

What I claim is—

1. As an improved article of manufacture, a flexible belting composed of woven or fibrous material having an exterior coating of elastic material formed on the gripping-face of the belt into transverse parallel flutings, substantially as described.

2. A flexible woven or fibrous driving-belt having an exterior coating of rubber smooth and plain on one side and provided with the transverse parallel flutings on the other side, substantially as described.

In testimony that I claim the foregoing as my own I affix my signature in presence of two witnesses.

GEORGE P. DODGE.

Witnesses:
ALFRED J. LE CLAIR,
W. H. WADSWORTH.